Nov. 28, 1950 — P. CROCHET ET AL — 2,531,612

METHOD FOR MELTING GLASS BY ELECTRICITY

Filed March 20, 1945

INVENTORS.
Pierre Crochet
Roger Emile Lambert
BY F. Bascom Smith
ATTORNEY.

Patented Nov. 28, 1950

2,531,612

UNITED STATES PATENT OFFICE 2,531,612

METHOD FOR MELTING GLASS BY ELECTRICITY

Pierre Crochet and Roger Emile Lambert, Paris, France, assignors to Societe Anonyme des Manufactures des Glaces & Produits Chimiques de Saint-Gobain, Chauny & Cirey, Paris, France Application March 20, 1945, Serial No. 583,774
In France February 10, 1944

Section 1, Public Law 690, August 8, 1946
Patent expires February 10, 1964

6 Claims. (Cl. 13—34)

The present invention relates to the manufacture of materials such as glass, which are melted by the heat developed within said materials by an electric current passing through the mass of said materials.

In the practice of such electric melting, difficulties have been encountered for the starting of the operation by the fact that at normal temperature glass is a bad conductor of electric current and so is the batch mixture commonly used for its production.

It has already been proposed to use special heating means such as oil burners, coal hearths and even electric radiating resistors to bring to the molten state the portion of the mass to be melted located between the electrodes supplying the electric current to the furnace.

It has also been proposed to intimately mix the glass batch with coal particles or even pulverized oxides or metals, in order to increase the conductivity at low temperature of the mass to be melted. But the introduction of these materials has, among other drawbacks, the disadvantage of causing an undesirable coloration of the glass.

One might also provide in the tank bottom channels at the ends of which the electrodes penetrate, such channels being provided with a Nichrome or a fusible electric resistance connecting the ends of the electrodes and filled with a glass having a low melting point. But said process has also the disadvantage of introducing, into the glass batch, elements which, by their nature or their proportions, more or less spoil the quality of the final glass.

Our invention has for its object a process for starting furnaces where the melting and the manufacture of glass or any other material is produced by the Joule effect of an electric current passing through the mass, such starting operation being accomplished without any auxiliary heating means nor the introduction into the mass of any element modifying the glass composition.

Our invention provides, for starting the melting operation, a process which consists in placing between the electrodes within the glass batch one or several conducting strata composed of elements of the batch chosen among those having the lowest resistivity at normal temperature, thus creating for the electric current zones of an electric conductivity lower than that of the batch to be melted. These strata act as heating elements; while heating the surrounding batch mass, they melt and are progressively incorporated into said batch, the molten mass spreading further and further until the whole mass is melted in the tank, without requiring the introduction of any material foreign to the glass composition.

The composition of the batch surrounding the strata will be adjusted in order that the final product resulting from the melting of the whole mass in the tank will have the desired composition for the glass.

For substances such as glass, some of the elements of the batch have a comparatively low resistivity at normal temperature. Among said elements, sodium carbonate has a resistivity of 20,000 ohms and anhydrous soda a resistivity of 13,500 ohms while the resistivity of other elements of the batch is very high, for example $9 \times 10^9$ ohms in the case of silica.

Among the substances which may compose the conducting strata, it is advisable to use in particular alkaline carbonates or oxides, as not only their resistivity at normal temperature is comparatively low, but moreover it decreases very rapidly when the temperature increases.

According to our invention, the conductivity of the conducting strata may be further increased by the insertion of conductors, such as graphite, or by replacing partly or totally the salts or bases of the conducting strata by their corresponding metals (Na, K, Fe, Ca, Mg, Pb, Al, etc.). Preferably such graphite elements or such metallic conductors are laid in the conducting stratum without any contact between each other, the interval separating them being, for instance, a few millimeters.

All the elements constituting the conducting stratum, though they seem to be in contact with one another, are submitted, under tension, to the action of interstitial, punctiform arcs causing, at the places where they occur, a high temperature which melts the so-called contact points.

Thus the resistance of the conducting stratum decreases: (a) because while melting the substances become conductive, (b) because the resistivity of molten alkaline compounds very rapidly decreases while the temperature increases, (c) because the fusion of the points of contact by means of the interstitial arcs suppresses the contact resistances and increases the apparent conductivity of the mass.

Thus, in conformity with our invention, the starting of the furnace is operated without using any supplemental heating means nor altering in any way the composition of the produced glass.

The hereabove described process may be also applied to induction furnaces. In such a case the conducting strata should be arranged in such a way that they will constitute closed circuits.

In the case of electrode furnaces, it may be advantageous to give to the conducting strata an electrical resistance equivalent to that of the furnace in the course of its normal operation; i. e., to the electrical resistance of the mass of the subsequently molten material contained in the furnace between the electrodes. The result of this arrangement is that the electrical power absorbed during the starting of the furnace has practically the same value as the power absorbed by the furnace during its normal operation.

According to our invention, the conducting strata may eventually include granulated glass or silica for decreasing their conductivity.

The conducting strata may also be so constituted that they will be partly or totally agglomerated by conductive alkaline binders such as sodium or potassium palmitates or butyrates.

The attached drawings show, simply as non-limitative examples, some embodiments of our invention.

Figure 1:
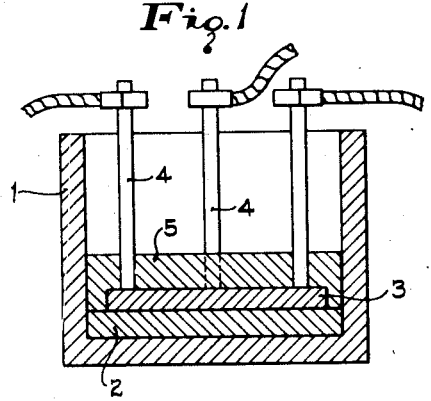
Figs. 1 and 2 show cross sections, vertical and horizontal respectively, of a first embodiment with conducting strata connected in a radial arrangement.
Figure 2:
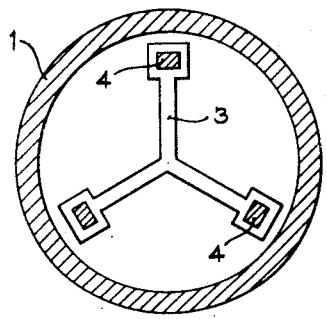

In the embodiment shown on Figs. 1 and 2, a first layer 2 of batch material is laid on the bottom of the furnace 1. On said layer is placed a conducting stratum 3 composed of elements chosen among the components of the batch having the lowest resistance at normal temperature. Said conducting stratum is given a radial shape and the electric current is fed through three electrodes 4 in contact with the extremities of the radii. The rest of the glass making materials is progressively introduced into the furnace upon the conducting layer 3, care being taken to adjust the composition of this rest so that the chemical composition of the whole molten mass in the furnace will correspond to the desired composition for the glass.

Figure 3:
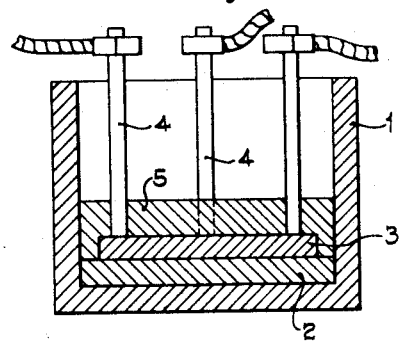
Figs. 3 and 4 show vertical and horizontal cross-sections of another embodiment of the invention, with conducting strata connected in a delta arrangement.
Figure 4:
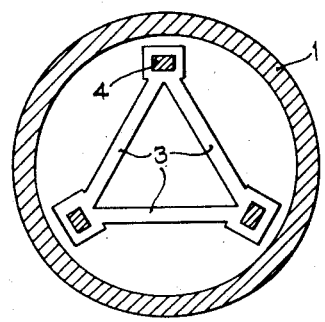

The materials of the conducting stratum, through which the electrical current passes, melt the surrounding material progressively, until the resistivity of this surrounding material becomes sufficiently low to enable the passage of the electric current therethrough. Instead of using a radial arrangement, a delta-arrangement may be used as shown in Figs. 3 and 4.

Figure 5:
Fig. 5 is a detailed view of a conducting stratum.

The conducting stratum may comprise, as hereabove stated, inclusions of graphite or of those metals corresponding to salts or bases forming part of the constituents of the glass. As schematically shown on Fig. 5 the conducting stratum 3 may comprise, for example, rods made of graphite 6, of alkaline carbonate 7, of alkaline base 8, of graphite 9, etc.

As a mere example, a composition of a conducting stratum is given hereunder:

In order to obtain a glass having the following composition: $SiO^2$ 74; $Na^2O$ 17; $K^2O$ 2; $CaO$ 6; $Fe^2O^3$ 1, the conducting stratum will be constituted of $Co^3NaH$, $Na^2O$ and C; for a conducting stratum having a section of 1 square decimeter and a length of 75 centimeters, i. e. a volume of 7,500 cubic centimeters, the proportion of each constituent will be:

| | Cubic centimeters |
|---|---|
| Calibrated graphite particles | 18 |
| $Na^2O$ | 80 |
| $Co^3NaH$ | 7,402 |
| Total | 7,500 |

With such proportion $Co^3NaH$ is reconstituted by the combustion of C and the glass composition is in no way altered.

The present invention is not limited to the hereabove given explanations and examples, but it may be worked out by using several different embodiments. The invention is also applicable to the melting and elaboration of substances other than glass, which are non-conductive at normal temperature and conductive in the liquid state and which among their constituents comprise elements having a sufficient high conductivity at low temperature.

What is claimed is:

1. In the melting of substances such as glass heated by the heat developed by the passage of an electric current through said substances in an induction furnace, the method of starting such melting operation which comprises placing within the glass raw materials to be melted at least one conducting closed circuit for the electric current constituted by at least one metal and oxygen containing glass raw material, such raw material having at normal temperature a higher conductivity than that of the bulk of the glass raw materials, and inducing an electric current within said circuit.

2. The method of making glass by passing an electric current through the glass materials that comprises forming from materials comprising alkali-metal-containing glass raw materials of the batch having relatively low resistivity at relatively low temperatures a closed path characterized by distinct parts between which interstitial punctiform arcs may be formed, and inducing an electric current therein.

3. The method of making glass by passing an electric current through the glass materials that comprises forming from raw materials of the batch having relatively low resistivity comprising alkaline carbonates and oxides a conducting path containing separated elements from the class of electrical conductors consisting of carbon and the metals corresponding to metallic oxides employed as glass making raw materials, between which interstitial punctiform arcs may be formed, and energizing said path by an electric current.

4. The method of making glass by passing an electric current through the glass materials that comprises forming from raw materials of the batch having relatively low resistivity comprising alkaline carbonates and oxides a conducting path, including in said conducting path separated elements of higher conductivity including a metal of a said material of low resistivity in the said conducting path, and energizing said path by an electric current.

5. The method of making glass by passing an electric current through the glass materials that comprises forming from raw materials of the batch having relatively low resistivity comprising alkaline carbonates and oxides a conducting path, including in said path separated elements of higher conductivity comprising graphite and metals corresponding to the alkaline salts or bases, and energizing the path with an electric current of sufficient intensity to form interstitial punctiform arcs within the path.

6. Glass materials adapted for melting having therein a path of higher electrical conductivity comprising about 18 parts by volume graphite particles, about 80 parts by volume $Na_2O$ and about 7,402 parts by volume $NaHCO_3$.

PIERRE CROCHET.
ROGER EMILE LAMBERT.

REFERENCES CITED

The following references are of record in the file of this patent:

UNITED STATES PATENTS

| Number | Name | Date |
|---|---|---|
| 702,081 | Voelker | June 10, 1902 |
| 750,093 | Cowles | Jan. 19, 1904 |
| 1,069,255 | Heroult | Aug. 5, 1913 |
| 1,084,856 | Haff | Jan. 20, 1914 |
| 1,099,113 | Boehm | June 2, 1914 |
| 1,267,317 | Erskine | May 21, 1918 |
| 1,680,163 | Miguet | Aug. 7, 1928 |
| 1,939,913 | Miguet | Dec. 19, 1933 |
| 1,944,521 | Miguet et al. | Jan. 23, 1934 |
| 1,970,112 | Wadman | Aug. 14, 1934 |
| 2,181,030 | Thomas | Nov. 21, 1939 |
| 2,208,586 | Kemmer | July 23, 1940 |

FOREIGN PATENTS

| Number | Country | Date |
|---|---|---|
| 603,252 | Great Britain | June 11, 1948 |

OTHER REFERENCES

Hodkin and Cousen, "Textbook of Glass Technology," 1925, D. Van Nostrand Company, (pages 130 and 131).